US006925784B2

(12) United States Patent
Escobar et al.

(10) Patent No.: US 6,925,784 B2
(45) Date of Patent: Aug. 9, 2005

(54) FLEXIBLE MANUFACTURING SYSTEM FOR CONSUMER PACKAGED PRODUCTS

(75) Inventors: Francisco Javier Escobar, Symmes Township, OH (US); Edward Daniel Theiss, III, Union Township, OH (US); Christopher Robert Lyman, Miami Township, OH (US)

(73) Assignee: The Procter & Gamble Company, Cincinnati, OH (US)

(*) Notice: Subject to any disclaimer, the term of this patent is extended or adjusted under 35 U.S.C. 154(b) by 80 days.

(21) Appl. No.: 10/659,867

(22) Filed: Sep. 11, 2003

(65) Prior Publication Data

US 2005/0055988 A1 Mar. 17, 2005

(51) Int. Cl.[7] .............................................. B65B 35/50
(52) U.S. Cl. ..................... 53/540; 53/531; 414/798.5; 414/493.7
(58) Field of Search ..................... 53/167, 168, 531, 53/540; 414/798.5, 793.7, 797.7, 797.8

(56) References Cited

U.S. PATENT DOCUMENTS

| | | | | |
|---|---|---|---|---|
| 3,813,847 A | * | 6/1974 | Kuhnle | .......................... 53/512 |
| 3,864,890 A | | 2/1975 | Ullman | |
| 3,866,388 A | * | 2/1975 | Koehler, III | .................. 53/500 |
| 4,039,182 A | | 8/1977 | Reist | |
| 4,201,286 A | | 5/1980 | Meier | |
| 4,294,345 A | | 10/1981 | Stauber | |
| 4,307,801 A | | 12/1981 | Hansch | |
| 4,320,894 A | | 3/1982 | Reist | |
| 4,381,056 A | | 4/1983 | Eberle | |
| 4,472,783 A | | 9/1984 | Johnstone | |
| 4,638,906 A | | 1/1987 | Winiasz | |
| 4,666,143 A | | 5/1987 | Reist | |
| 4,738,387 A | | 4/1988 | Jaufmann | |
| 4,746,007 A | | 5/1988 | Houseman | |
| 4,754,962 A | | 7/1988 | Kontz | |
| 4,852,722 A | | 8/1989 | Houseman | |
| 4,893,805 A | | 1/1990 | Ebele | |
| 4,902,184 A | * | 2/1990 | Fritz | ........................ 414/790.3 |
| 4,905,818 A | | 3/1990 | Houseman | |
| 4,911,423 A | | 3/1990 | Smith | |
| 4,921,294 A | | 5/1990 | Klopfenstein | |
| 4,936,739 A | * | 6/1990 | Provan et al. | ........... 414/797.7 |
| 4,951,419 A | | 8/1990 | Weber | |
| 4,982,834 A | | 1/1991 | Jacobsen | |
| 5,014,978 A | | 5/1991 | Smith | |
| 5,064,187 A | | 11/1991 | Muller | |
| 5,074,096 A | * | 12/1991 | Focke | ........................ 53/133.5 |
| 5,178,262 A | | 1/1993 | Merkli | |
| 5,186,223 A | * | 2/1993 | Rummage et al. | ............ 141/91 |

(Continued)

FOREIGN PATENT DOCUMENTS

| | | |
|---|---|---|
| EP | 0 375 196 B1 | 8/1996 |
| EP | 0 995 702 A1 | 4/2000 |

Primary Examiner—Sameh H. Tawfik
(74) Attorney, Agent, or Firm—Michael S. Kolodesh; Kevin C. Johnson

(57) ABSTRACT

A flexible manufacturing system for producing and packaging consumer products into different packages is disclosed. The system includes one or more supplying means for providing the consumer products, and a multiplicity of packaging means for packaging the consumer products into different packages. The system further includes one or more conveying means for conveying the consumer products from the supplying means to the packaging means. The conveying means forms a continuous path linking the supplying means with the packaging means. The continuous path includes a multiplicity of receptors capable of accepting, carrying, and discharging the consumer products. Further, the system includes one or more stacking means for arranging the consumer products into separate stacks of products prior to packaging.

14 Claims, 13 Drawing Sheets

U.S. PATENT DOCUMENTS

| | | | |
|---|---|---|---|
| 5,203,556 A | | 4/1993 | Smith |
| 5,220,770 A | * | 6/1993 | Szewczyk et al. ............ 53/493 |
| 5,280,895 A | | 1/1994 | Meier |
| 5,310,396 A | | 5/1994 | Momoi |
| 5,360,101 A | | 11/1994 | Carlen |
| 5,377,475 A | * | 1/1995 | Haarer et al. ................ 53/167 |
| 5,391,386 A | | 2/1995 | Mally |
| 5,660,382 A | | 8/1997 | Meier |
| 5,768,856 A | * | 6/1998 | Odenthal ..................... 53/443 |
| 5,772,391 A | | 6/1998 | Sjogren |
| 5,899,447 A | | 5/1999 | Muckenfuhs |
| 6,227,589 B1 | | 5/2001 | Brown |
| 6,341,771 B1 | | 1/2002 | Sasson |
| 6,354,048 B1 | | 3/2002 | Gillett |
| 6,574,520 B1 | | 6/2003 | Liu |

* cited by examiner

FLEXIBLE MANUFACTURING SYSTEM FOR CONSUMER PACKAGED PRODUCTS

FIELD OF THE INVENTION

This invention relates to a flexible manufacturing system for packaged consumer products. More particularly, this invention relates to a flexible manufacturing system that allows production and packaging of the same or different consumer products into different packages.

BACKGROUND OF THE INVENTION

Conventional methods of manufacturing and packaging of consumer products, such as, for example, feminine hygiene pads and tampons, baby diapers, adult incontinence articles, beauty products, pharmaceutical products, food products, drink products, and the like, do not have the flexibility to package the same or different products in different packages. The conventional methods of manufacturing and packaging of consumer products are typically limited to manufacturing and packaging a particular product into a particular package, wherein each package contains the same product as well as the same number of products.

However, the contemporary consumer includes consumers from many regions of the world, whose needs can vary depending on cultural, economical, and others aspects, resulting in different preferences for different packaging options, which, unfortunately, are yet not available or too expensive to provide.

For example, there is a need for a manufacturing system that would be flexible to have the capability to cost-effectively package the same or different consumer products into different packages. The different packages can vary by the package form (e.g., a bag, a carton, a wrap, and the like); by the number of products containing per package (from a single product to any suitable multiple number of products); and/or by containing the same or different products per package.

Furthermore, there is a need for a manufacturing system that would be flexible to accommodate on-demand operations for adding special text and/or images to selective products to meet particular marketing needs, including improved product identification and selection by consumers.

Furthermore, there is a need for a manufacturing system that would be flexible to accommodate changes in production needs for selective consumer products in order to more cost-effectively utilize the product supply and the product packaging capabilities of the manufacturing system.

SUMMARY OF THE INVENTION

The present invention is directed to a flexible manufacturing system for producing and packaging consumer products into different packages. The flexible manufacturing system of the present invention includes one or more supplying means for providing the consumer products in configuration suitable for packaging. The flexible manufacturing system further includes a multiplicity of packaging means for packaging the supplied consumer products into different packages. The flexible manufacturing system further includes one or more conveying means for conveying the supplied consumer products from the supplying means to the packaging means. The one or more conveying means forms a continuous path linking the one or more supplying means with the multiplicity of packaging means. The continuous path includes a multiplicity of receptors capable of accepting, carrying, and discharging the consumer products. The flexible manufacturing system further includes a one or more stacking means for arranging the consumer products into separate stacks for packaging. The one or more stacking means are disposed vertically between the one or more supplying means and the multiplicity of packaging means.

DETAILED DESCRIPTION OF THE INVENTION

Figure 1:
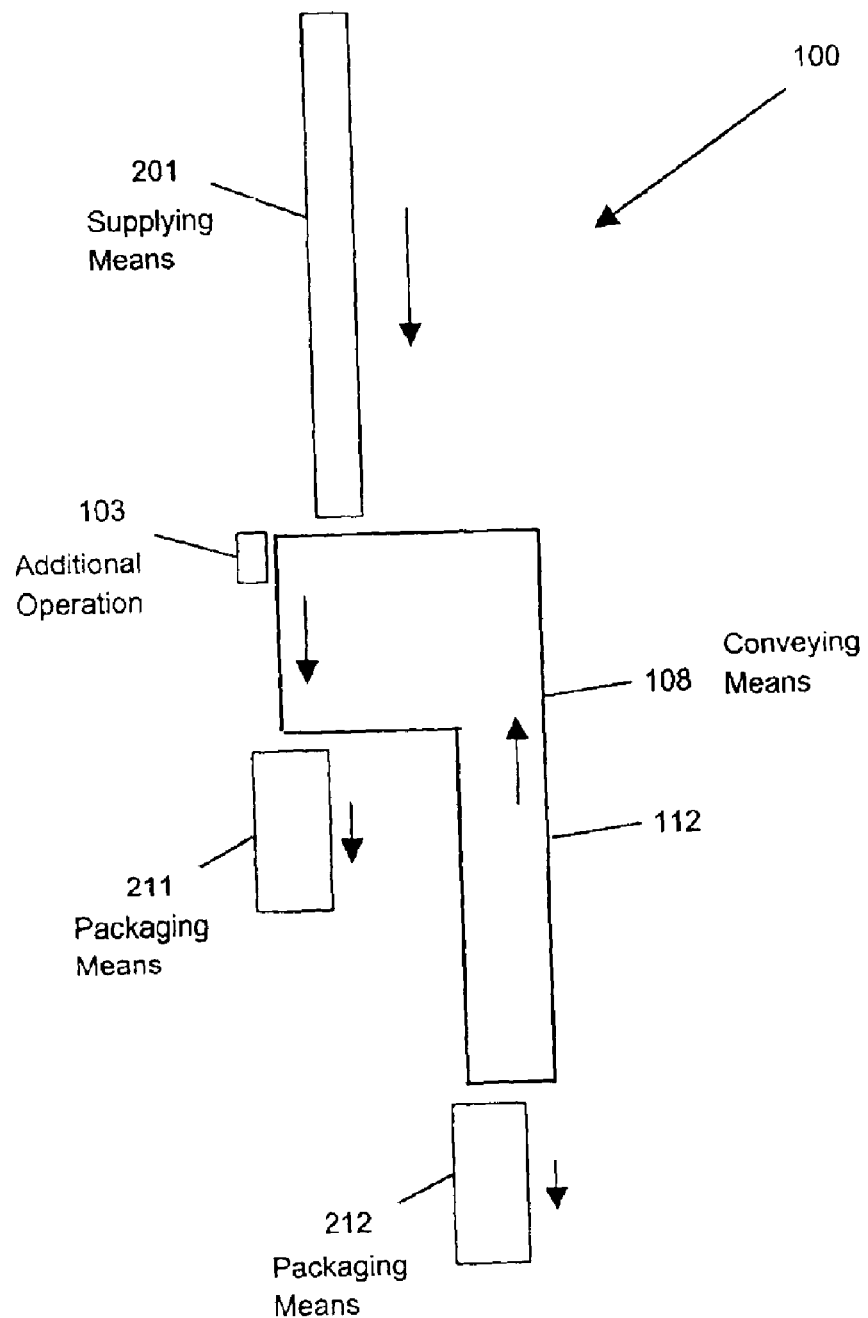
FIG. 1 is a schematic plan view of a first flexible manufacturing system of the present invention capable of providing the same products and packaging the same products into different packages.

The present invention is directed to a flexible manufacturing system that enables production and packaging of the same or different consumer products into different packages.

The term "consumer product(s)" or "product(s)" refers herein to any product intended for personal use by a consumer. Such products can include personal care products, such as, disposable feminine hygiene products including feminine sanitary napkins or pads, tampons, incontinence articles and the like; disposable baby products including baby fastening diapers, baby pull-on diapers, baby swim pants, baby bibs, and the like; disposable adult incontinence products including adult pads and the like; and wipes including baby wipes, adult wipes, household cleaning wipes, and the like. Typically, the above personal care products are folded before packaging to have a pad-like or flat configuration. In addition, the term "consumer product(s)" or "product(s)" includes herein other products intended for personal use that may not have a pad-like configuration, such as, for example, food products, drink products, beauty or cosmetic products, and the like.

The term "the same product(s)" refers herein to products produced on the same production line or different production lines according to the same product specification and includes any consumer product defined above.

The term "different product(s)" refers herein to both (1) different types of products (e.g., a feminine hygiene pad, a fastening diaper, a pull-on diaper, and the like) and (2) the same type of products having different sizes (e.g., feminine hygiene pads having different sizes).

The term "the same package(s)" refers herein to packages (1) having the same package form (e.g., a bag, a soft pack, a pouch, a box, a wrap, and the like) and (2) containing the same number of products per package (e.g., from a single product to any suitable number of products).

The term "different package(s)" refers to packages (1) having different packaging forms (e.g., a bag, a soft pack, a pouch, a box, a wrap, and the like); (2) containing a different number of products per package (e.g., from a single product to any suitable number of products); and/or (3) containing the same or different products.

In general, the flexible manufacturing system of the present invention can include one or more product supplying means, a multiplicity of packaging means, and one or more conveying means linking the supplying means with the packaging means.

The term "supplying means" refers herein to any apparatus capable of providing the same products in a form suitable for packaging. The term "supplying means" can include a production line capable of producing the same products, for example, a production line capable of producing the same feminine hygiene pads, or a production line capable of producing the same baby diapers, and the like.

The term "packaging means" refers herein to any apparatus capable of packaging one or more consumer products into the same packages, intended for use by a consumer.

The term "conveying means" refers herein to an apparatus having a multiplicity of receptors capable of accepting the products from the supplying means and conveying to the packaging means. The receptors can be of any suitable design utilizing any means or combination of means suitable for accepting, holding, and releasing a particular product. Examples of the suitable means can include gripping means, vacuum, magnetic, electromagnetic, electrostatic, and the like. The receptors are associated with a continuous path extending between the supplying means and the packaging means. The continuous path can be a moving path or a stationary path. The moving path can include a chain, cable, belt and the like, where the receptors can be attached to the moving path at suitable intervals. The stationary path can include any suitable tracking means, where receptors are not attached to the track and are moved in the track in a desired direction by any suitable means, disposed inside or outside of the track, including a chain, cable, compressed air, electro and/or magnetic means, gravity and the like.

The present of the flexible manufacturing system of consumer packaged products will be described below in terms of several examples, which describe and demonstrate embodiments within the scope of the present invention. The examples are given solely for the purpose of illustration and are not to be construed as limitations of the present invention, as many variations thereof are possible without departing from the spirit and scope of the invention.

EXAMPLE 1

First Flexible Manufacturing System

FIG. 1 shows a schematic plan view of a first flexible manufacturing system 100 of the present invention, capable of packaging the same products into different packages. As noted above, the term "the same products" refers to products produced on the same production line or different production lines according to the same product specification and can include any consumer product defined above.

The first flexible manufacturing system 100 includes one or more supplying means 201 capable of providing the same products. As noted above, the term "supplying means" refers herein to any apparatus capable of providing the same products suitable for packaging. The term "supplying means" can include a production line capable of producing the same products, for example, a production line capable of producing the same feminine hygiene pads, or a production line capable of producing the same baby diaper, and the like. It should be understood that the number of supplying means 201 of the first flexible manufacturing system 100 can be any suitable number as long as all of the supplying means 201 are capable of providing the same products. The supplying means 201 can include one or more production lines capable of producing the same products.

The first flexible manufacturing system 100 further includes a multiplicity of packaging means. As noted above, the term "packaging means" refers herein to any apparatus capable of packaging one or more consumer products into the same packages intended for use by a consumer.

For simplicity of description, the first flexible manufacturing system 100 is shown in FIG. 1 to have two packaging means 211 and 212; however, the number of packaging means can vary to include any suitable number. Each of the packaging means 211 and 212 can preferably provide the same packages defined by the package form (e.g., a bag, a soft pack, a pouch, a box, a wrap, and the like) and/or by the number of products in the package. For example, the packaging means 211 can provide soft pack packages and the packaging means 212 can provide box packages, wherein both types of packages contain different or the same number of products. In another example, both packaging means 211 and 212 can provide the same form packages, for example, soft packs, however, the number of products containing in the soft packs provided by the packaging means 211 can be different from the number of products containing in the soft packs provided by the packaging means 212.

Figure 2:
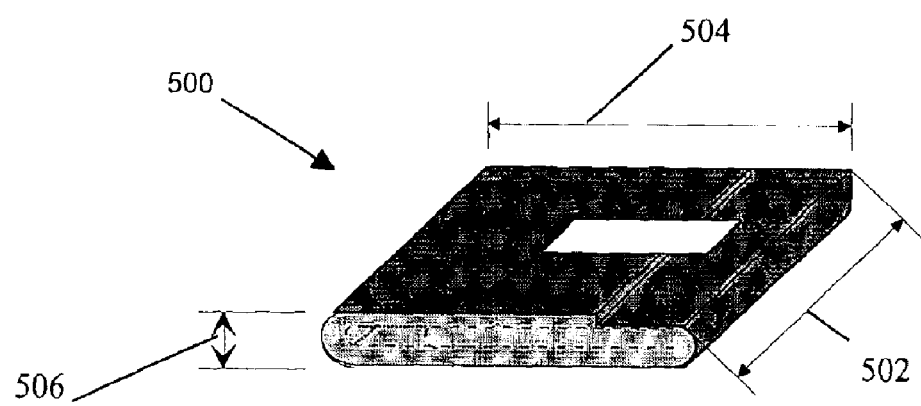
FIG. 2 is a simplified perspective view of an exemplary feminine hygiene pad in a folded configuration that can be provided by supplying means of the first flexible manufacturing system of FIG. 1.

The first flexible manufacturing system 100 can be suitable for any consumer product defined above, however, the first flexible manufacturing system 100 will be specifically described herein with respect to the pad-like products defined above and, more specifically, with respect to a feminine hygiene pad 500 shown in FIG. 2.

The feminine hygiene pad 500 of FIG. 2 can be provided by the supplying means 201, preferably in a folded configuration, as shown in FIG. 2, suitable for packaging. The feminine hygiene pad 500 can have a folded pad width 502, a folded pad length 504, and a folded pad caliper 506. The above folded dimensions can vary depending on a particular product size, absorbent capacity, and the like.

The first flexible manufacturing system 100 of FIG. 1 further includes a conveying means 108 for conveying the products 500 from the supplying means 201 to the packaging means 211 and 212. As noted above, the conveying means of the present invention, including the conveying means 108, can have a multiplicity of receptors attached to a continuous path 112, wherein both the receptors 110 and the continuous path 112 can have various embodiments suitable for handling different products. However, specifically for the pad-like products, including the feminine hygiene pad 500 of FIG. 2, the conveying means 108 will be described herein in terms of a first embodiment 109 of the conveying means 108 (best shown in FIG. 3), particularly suitable for handling the pad-like products, including the feminine hygiene pad 500 of FIG. 2.

Figure 3:
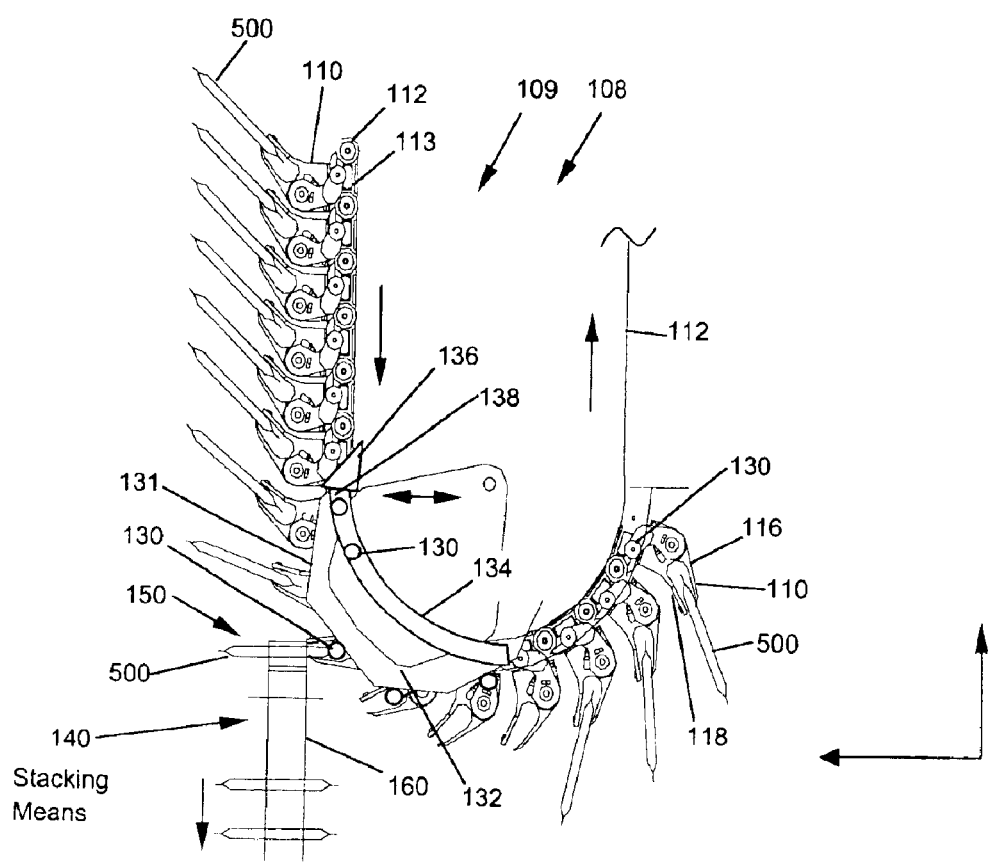
FIG. 3 is a simplified elevation view of a portion of one embodiment of the conveying means of the first flexible manufacturing system of FIG. 1, particularly suitable for handling the feminine hygiene pad of FIG. 2.

FIG. 3 shows an elevation view of a portion of the first embodiment 109 of the conveying means 108 of the present invention. The first embodiment 109 includes a multiplicity of receptors 110 having gripping capability particularly suitable for accepting, holding, and discharging the pad-like products, including the feminine hygiene pad 500 of FIG. 2. The receptors 110 are attached to a continuous path 112, one embodiment of which comprises a chain 113. The chain 113 can be of any suitable length and can be driven by any suitable means. The grip receptors 110, chain 113, and suitable driving means can be part of a commercial Gripper Conveyor PCC 902 from Idab Wamac International AB (Box 189, S575 22, Eksjo, Sweden). The embodiment 109 of the conveying means 108 of FIG. 3 will be described in more detail below.

With respect to the pad-like products, including the feminine hygiene pad 500 of FIG. 2, the first flexible manufacturing system 100 can include a multiplicity of stacking means for forming separate stacks of the pad-like products suitable for further packaging. The stacking means can be suitably disposed between the conveying means and the packaging means, as best shown in FIG. 4.

Figure 4:
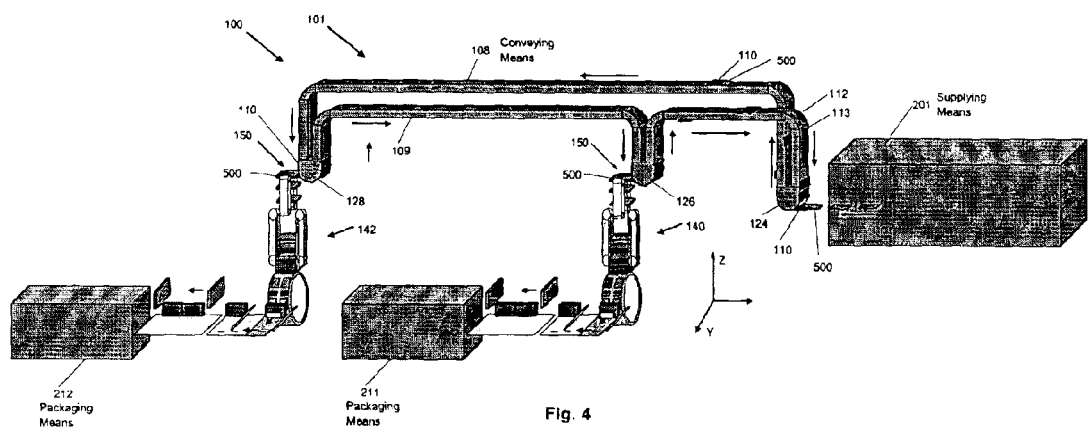
FIG. 4 is a schematic perspective view of a first embodiment of the first flexible manufacturing system of FIG. 1, particularly suitable for handling the feminine hygiene pad of FIG. 2.

FIG. 4 is a simplified perspective view of a first embodiment 101 of the first flexible manufacturing system 100 of FIG. 1. The first embodiment 101 further includes stacking means 140 and 142, preferably disposed vertically between the conveying means 108 and the packaging means 211 and 212, respectively. The stacking means 140 and 142 are particularly suitable for accepting the pad-like products, including the feminine hygiene pad 500, from the receptors 110 and arranging the accepted products 500 into separate stacks for packaging. The stacks can include any suitable number of products, from a single product to any suitable multiple number of products, preferably up to 100 products per stack. The stacking means of the present invention will be described in more detail below.

Referring again to FIG. 3, the gripping capability of the receptors 110 for holding the pad 500 is provided by a suitable gripping force provided by a spring (not shown) incorporated in the design of the receptor 110 to keep the jaws 116 and 118 of the receptor 110 in a closed position. (However, alternatively to the above spring, a suitable gripping force for holding a product by the jaws 116 and 118 can be provided by any suitable means known in the mechanical art.) The jaw 116 can pivot to and from the jaw 118, which is stationary, to form a closed or an open position with the jaw 118.

As shown in FIG. 3, the open position between the jaws 116 and 118 can be provided by directing a cam follower 130, attached to the pivoting jaw 116, to follow a cam profile 131 of an opening cam 132. The opening cam 132 can be disposed at any suitable location of the continuous path 113 to provide an open position between the jaws 116 and 118. Thus, referring again to FIG. 4, in the first embodiment 101 of the flexible manufacturing system 100, the opening cam 132 is disposed at several places of the continuous path 112 to provide a product pick station 124 and product release stations 126 and 128. The product pickup station 124 is adjacent to the product output of the supplying means 201, and the product release stations 126 and 128 are adjacent to the stacking means 140 and 142, respectively.

It should be noted that although FIG. 4 shows one pickup station 124 and two release stations 126 and 128, the number of product pickup and product release stations can vary. Typically, the number of product pickup stations 124 can correspond with the number of supplying means 201, which can be any suitable number, and the number of product release stations 126 or 128 can correspond with the number of packaging means 211 or 212, which can also be any suitable number.

As best shown in FIG. 3, adjacent to the opening cam 132, there is shown a bypass cam 134 and a diverter 136. The diverter 136 is capable of moving in and out of a cam entrance 138 of the bypass cam 134 to block or open the cam entrance 138 of the bypass cam 134, thus, enabling or preventing the entering of the cam follower 130 into the bypass cam 134. For example, when the cam entrance 138 is not blocked by the diverter 136, the cam entrance 138 is open for the cam follower 130 to enter the bypass cam 134 without causing an opening action between the jaws 116 and 118 of the receptor 110. Alternatively, when the cam entrance 138 is blocked by the diverter 136, the cam follower 130 follows the cam profile 131 of the opening cam 132, thus, activating an opening action between the jaws 116 and 118 for either accepting the product 500 at the product pickup station 124 or, alternatively, releasing the product 500 at the product release stations 126 or 128.

The diverter 136 can be activated by any suitable means known in the art including a servomotor, an air cylinder, a solenoid, and the like. A timely activation of the diverter 136 enables to select which of the receptors 110 will become open or remain closed when the receptor 110 passes the pickup station 124 or the release stations 126 and 128.

When passing the pickup station 124, those receptors 110 that follow the cam profile 131 of the opening cam 132, have jaws 116 and 118 in the open position suitable for accepting the feminine hygiene pad 500 provided by the supplying means 201. After the receptor 110 passes the opening cam 132, the jaws 116 and 118 become sufficiently closed to hold the pad 500 for conveying the pad 500 to the release stations 126 or 128. At the release stations 126 and 128, certain receptors 110 are selected for the opening of the jaws 116 and 118 to enable the release of the pad 500.

Referring again to FIG. 4, at the release stations 126 or 128, the pad 500 is released from the jaws 116 and 118 of the selected receptors 110 at a releasing position 150. At the releasing position 150, the pad 500 is preferably in a horizontal orientation and preferably above the stacking means 140 or 142. The term "horizontal orientation" refers to a spatial orientation of the pad 500, at which the pad 500 forms an angle of less than 45 degrees with a plane parallel to the horizon.

The selection of the receptors 110 to be open at a particular release station 126 or 128 for providing the released product 500 for further packaging by the packaging means 211 or 212, depends on the specifics of the packaging operation, including the number of packaging means, their capabilities, production schedules, and the like. A suitable control system can provide reliable selection and operation of the receptors 110 at the releasing and the pickup stations of the flexible manufacturing system of the present invention.

Stacking Means

Referring again to FIG. 3, in the releasing position 150, the jaws 116 and 118 release the pad 500 from their gripping action and then move from the pad 500 at a suitable trajectory extending downwardly and laterally from the released pad 500, corresponding with the cam profile 131 of the opening cam 132.

Referring to FIGS. 3 and 4, from the releasing position 150, the pad 500 is descended in a Z direction and manipulated by the stacking means 140 or 142 to become subsequently a part of a specific stack of pads 500, which can include one or more pads 500, for further packaging into a particular package.

In the first embodiment 101 of the first flexible manufacturing system 100, which is directed to handle the same products, as defined above, each of the stacking means 140 and 142 is capable to stack the same pad-like products, including the feminine hygiene pad 500. However, in other embodiments of the present invention directed to handle different products, the stacking means 140 or 142 can be capable of handling also different pad-like products having different dimensions and shapes, varying within a suitable range.

The stacking means 140 and 142 of the present invention will be described with respect to the stacking means 140, shown in more detail in FIG. 5.

Figure 5:
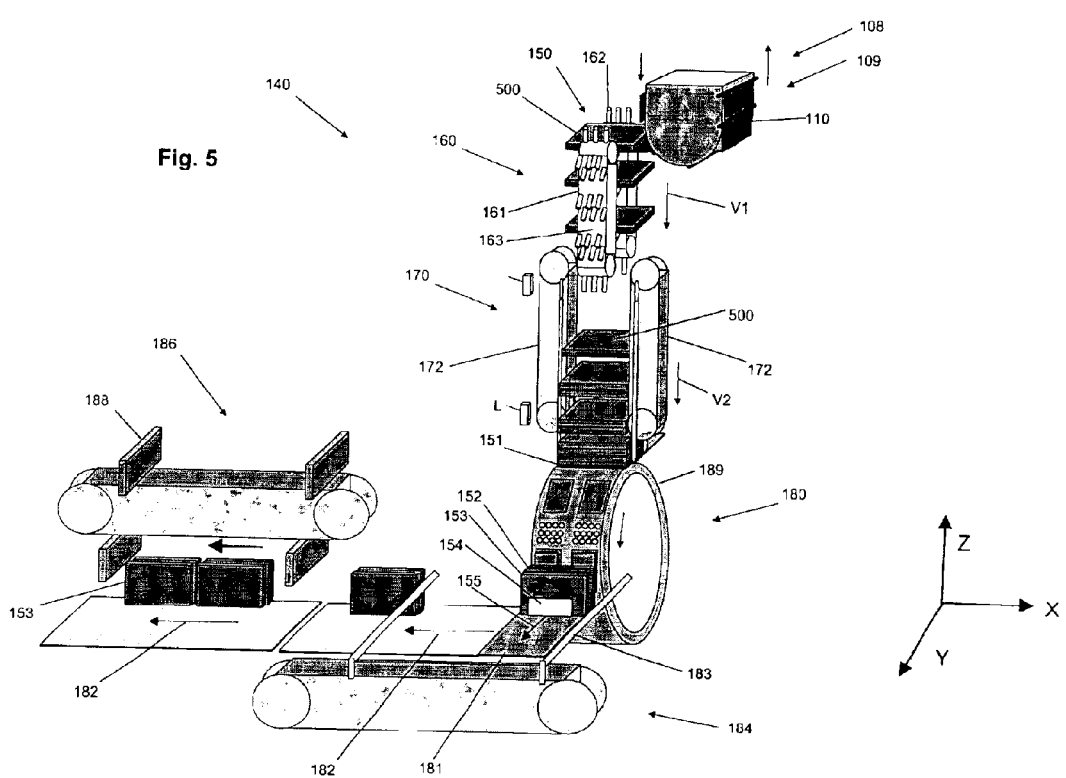
FIG. 5 is a simplified perspective view of the stacking means of the present invention, shown in FIG. 4.

Referring to FIG. 5, showing a simplified perspective view of the stacking means 140 accepting pads 500, in their horizontal orientation, at the releasing position 150 from the open receptors 110 of the first embodiment 109 of the conveying means 108 shown in FIG. 3. The stacking means 140 includes a first descending means 160 disposed at the outmost vertical position of the stacking means 140 for receiving the pads 500 at the releasing position 150 and for maintaining the horizontal orientation of the pads 500 during their descent toward a second descending means 170 disposed adjacent below the first descending means 160.

Figure 5A:
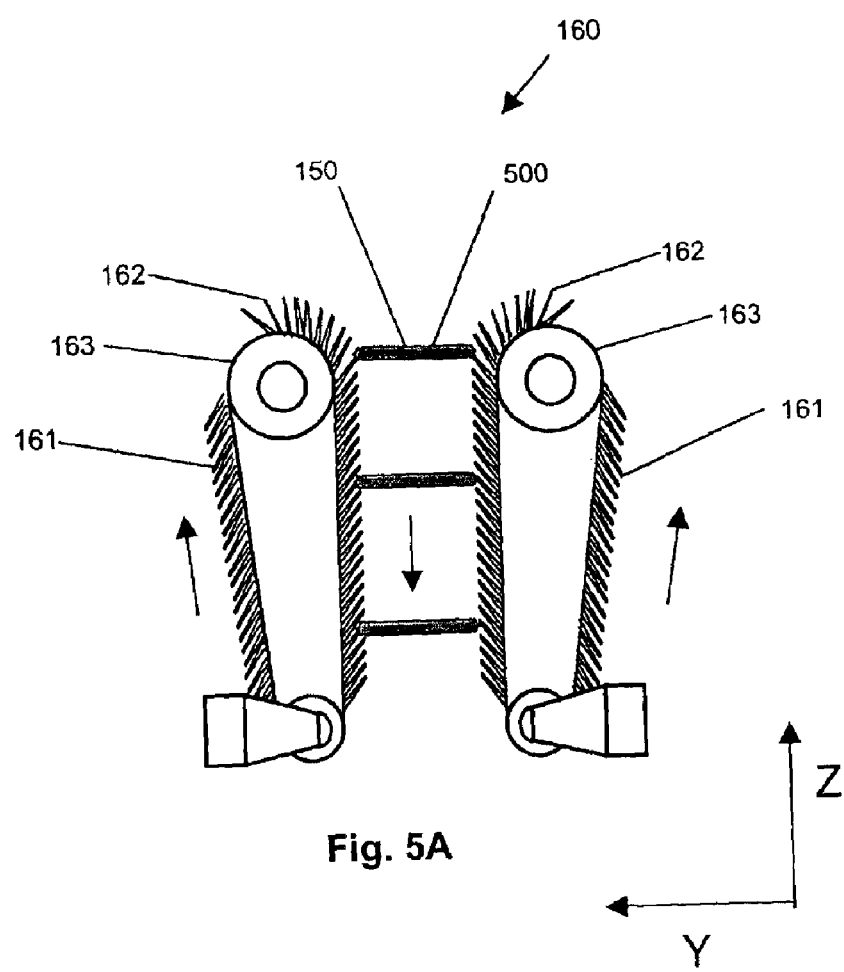
FIG. 5A is a simplified elevation view of a first descending means of the stacking means of FIG. 5.

As shown if FIG. 5 and also in FIG. 5A, which is another elevation view of the first descending means 160, the first descending means 160 includes two continuous belts 161 disposed vertically. The two belts 161 are facing each other at a distance adjustable within a preferred range of about 50 mm to 250 mm. This distance between the opposing belts 161 can be adjusted by any suitable means. Further, this distance can be less than 50 mm or greater than 250 mm, for products having dimensions outside the above range.

Each belt 161 includes a multiplicity of prongs 162 extending from the outer surface 163 of each of the belts 161. The prongs 162 are preferably flexible. A suitable belt 161 can be molded from a 60 D durometer polyurethane to have a multiplicity of 22-mm-long polyurethane prongs forming 45 degrees angles with the outer surface 163 of the belt 161 in the longitudinal direction of the belt 161 and forming a 13 mm-by-13 mm spacing pattern preferably throughout the outer surface 163 of the belt 161, can be obtained from FN Sheppard & Co. of Erlanger Ky. under specification F2W1-2E5. The above molded belt 161 is a continuous belt and is about 45 mm wide and about 250 mm long. It should be noted, however, that other specifications and dimensions of the belt 161 including flexible prongs 162 can be also suitable for the present invention.

The prongs 162 from the opposing belts 161 face each other to provide support for the pads 500 after their release from the jaws 116 and 118 of the receptors 110 of the conveying means 108. The opposed prongs 162, supporting the pads 500, descent at a suitable vertical velocity V1 and maintain the pads 500 in their horizontal orientation defined above. Both belts 161 can be driven by any suitable means.

Referring again to FIG. 5, the second descending means 170 not only continues to maintain the descending pads 500, in their horizontal orientation, but also delivers the pads 500 into a pickup position 151. In the pickup position 151, the pad 500 is in direct contact with a rotary drum 180 disposed adjacent below the second descending means 170.

Figure 6:
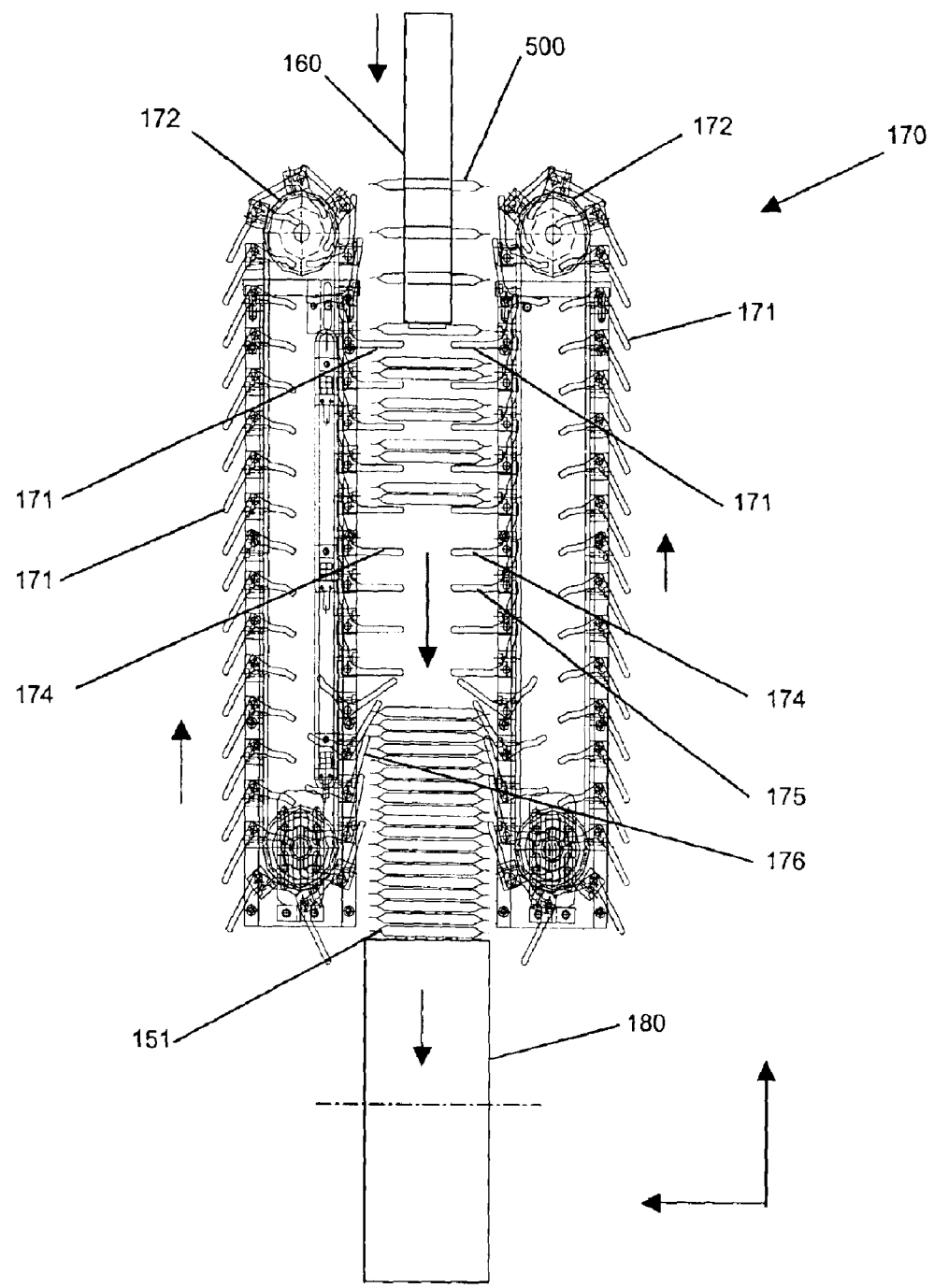
FIG. 6 is a simplified elevation view of a second descending means of the stacking means of FIG. 5.

FIG. 6 shows an elevation view of the second descending means 170 of FIG. 5 in more detail. The second descending means 170 includes preferably two pairs of continuous opposing chains 172 disposed vertically and forming two opposing chain conveyors extending preferably about 700 mm vertically. It should be noted that the shown chains 172 are preferred; however, other suitable means, including belts and the like, can be utilized as well. Further, the vertical dimension of the opposing chain conveyors can be any other suitable dimension.

Referring to FIG. 6, each pair of chains 172 includes a multiplicity of paddles 171 pivotally attached thereto. The paddles 171 from the opposing pairs of chains 172 face each other horizontally to provide support for one or more pads 500 descending from the first descending means 160. The paddles 171 can be manufactured preferably from a low friction polyurethane, for example, NOVATRON®, or any other suitable material. The paddles 171 can be spaced vertically from each other at any pitch length suitable for a particular product; however in a preferred embodiment of the present invention, particularly suitable for the pads 500 of FIG. 2, the spacing between the adjacent paddles 171 can range from about 40 mm to about 50 mm.

For supporting the pads 500, the opposing paddles 171 are oriented substantially horizontally, forming two opposing platforms 174, each one preferably extending 65 mm toward each other and forming an adjustable gap between the opposing platforms 174 preferably of about 30 mm to 60 mm. The opposing platforms 174 are substantially leveled with each other in a horizontal position 175. However, due to the pivoting attachment of the paddles 171 to the chains 172, the opposing platforms 174 can rotate from their horizontal position 175 into a vertical position 176 to increase the distance between the opposing paddles 171. The increased distance between the paddles 171 is greater than the pad 500 and, thus, enables the paddles 171 to pass around the pads 500, as shown in FIG. 6. This capability ensures against overfeeding, jamming, or otherwise damaging the pads 500. This capability also suitably maintains the pad 500 in the pickup position 151 at the rotary drum 180.

Further, to ensure against overfeeding, jamming, or otherwise damaging the pads 500, the second descending conveyor 170 further includes a high level detection means H and a low level detection means L as shown in FIG. 5. When the second descending means 170 is full with pads 500, the high level detection means H will send a signal to terminate the supply of pads 500 to the first descending means 160, by directing the receptors 110 through the bypass cam 134 (FIG. 3). Alternatively, when the second descending means 170 do not contain a minimum number of pads 500 needed for forming a stack 153, the low level detection means L will send a signal to stop the rotary drum 180. The position of the low level detection means L and the high level detection means H can be adjusted to fit the specific needs. The low level detection means L and the high level detection means H can include any suitable device, for example, a photo eye device model W-T2P430 obtainable from SICK, Inc. (6900 West 110$^{th}$ Street, Bloomington, Minn. 55438)

The horizontally opposed paddles 172, supporting the pad 500, descend preferably at any suitable velocity V2. Both pairs of chains 172 can be driven by any suitable means.

The second descending means 170 also preferably includes chute guides 177 (FIG. 5) for suitably aligning and directing the pads 500 for the pickup position 151. The chute guides 177 can include any suitable means known in the art.

Figure 7:
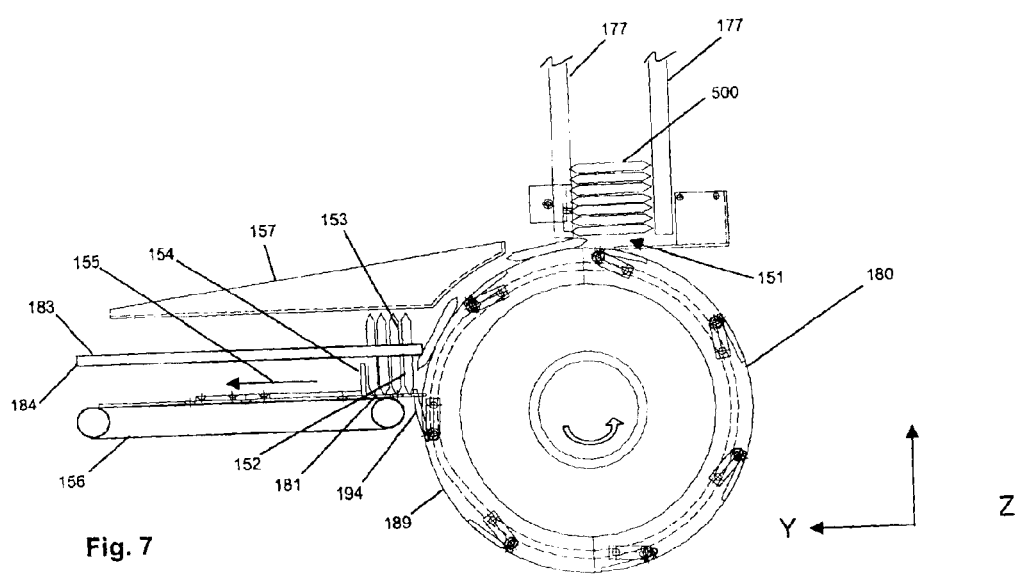
FIG. 7 is a simplified elevation view of a rotary drum of the stacking means of FIG. 5.

Referring again to FIG. 5, from the pickup position 151, the pad 500 can be transferred to a stacking position 152 by the rotary drum 180 disposed adjacent below the second descending means 170. As best shown in FIG. 7, in the stacking position 152, the pad 500 is oriented vertically, with its edge being against a supporting surface 181, which is preferably perpendicular to the outer surface 189 of the rotary drum 180. The rotary drum 180 is a vacuum drum capable of picking up and transferring one pad 500 at a time. It should be noted however, that although the use of vacuum for picking and transferring the pad 500 is preferred, a suitable non-vacuum means, for example mechanical grippers, capable of separating a single pad 500 from other pad(s), accumulated above the pickup position 151, and then transferring the pad 500 to the stacking position 152, can be also utilized within the scope of the present invention.

FIG. 7 is a side elevation view of the rotary drum 180 of FIG. 5, showing also both interfaces of the rotary drum 180, with the chute guides 177 at the pickup position 151 and with a bar conveyor 184 (best shown in FIG. 5) at the stacking position 152. The rotary drum 180 also includes a drum shell 190 and a vacuum manifold 192, both shown best in FIG. 8. The drum shell 190 includes a series of vacuum holes 193 that can be brought in fluid communication with the vacuum manifold 192 at a certain point of rotation of the rotary drum 180, for example, at the pickup position 151. At the stacking position 152, the fluid communication between the vacuum holes 193 and the vacuum manifold 192 is terminated.

During the rotation of the rotary drum 180, the level of vacuum provided for the pad 500 can change. For example, a higher level of vacuum can be needed for picking the pad 500 from the pickup position 151, and a lower level of vacuum for holding the pad 500 by the rotary drum 180 during the rotation of the rotary drum 180. These higher and lower vacuum levels can be provided by the vacuum manifold 192.

Figure 8:
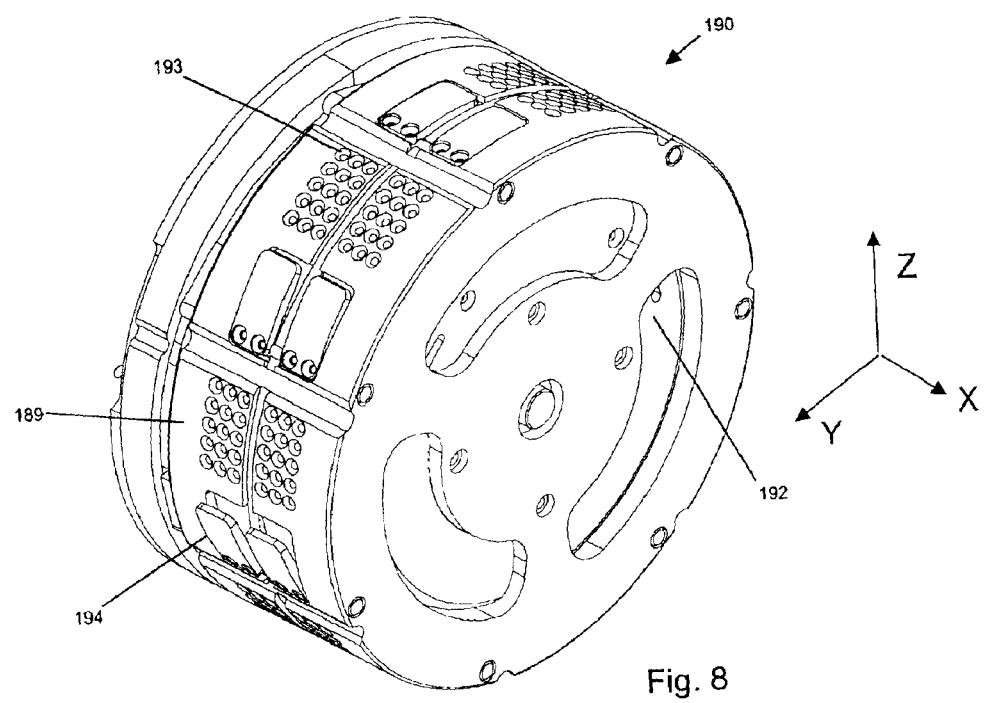
FIG. 8 is a perspective view of a drum shell and a vacuum manifold of the rotary drum of FIG. 7.

For the release of the pad 500 from the rotary drum 180, the vacuum is terminated and a suitable flow of compressed air exiting the vacuum holes 193 is provided. In addition, to ensure the release of the pad 500, one or more push off fingers 194 rising from the outer surface of the rotary drum 180 (as shown in FIGS. 7 and 8) for pushing the pad 500 off the outer surface 189 of the rotary drum 180 can be also used. The push off fingers 194 can be operated by any suitable means, including a cam, a solenoid, and the like.

Referring to FIGS. 5 and 7, the rotary drum 180 transfers one pad 500 at a time from the pickup position 151 to the stacking position 152. In the stacking position 152, the pad 500 is held in its upright position by a moving guide 154, which is capable to move in a first direction 155, disposed preferably perpendicular to the outer surface 189 of the rotary drum 180, at a speed suitable for accumulating a desired number of pads 500 to form a stack 153. The moving guide 154 can be driven by any suitable means including a belt 156 (FIG. 7). In the stacking position 153, the pad 500 can be also supported by any other suitable means including a stationary guide 157 (FIG. 7).

Referring again to FIG. 5, after a desired number of pads 500 is accumulated in the stack 153, the stack 153 is pushed in a second direction 182, which is preferably perpendicular to the first direction 155, by a bar 183 of the bar conveyor 184 to an overhead conveyor 186. The overhead conveyor 186 is capable of collecting one or more stacks 153 and then pushing the collected one or more stacks 153 by an overhead plate 188 in the second direction 182 to the packaging means 140 (not shown in FIG. 5) for packaging into a suitable package.

Alternative Stacking Positions

Figure 9:
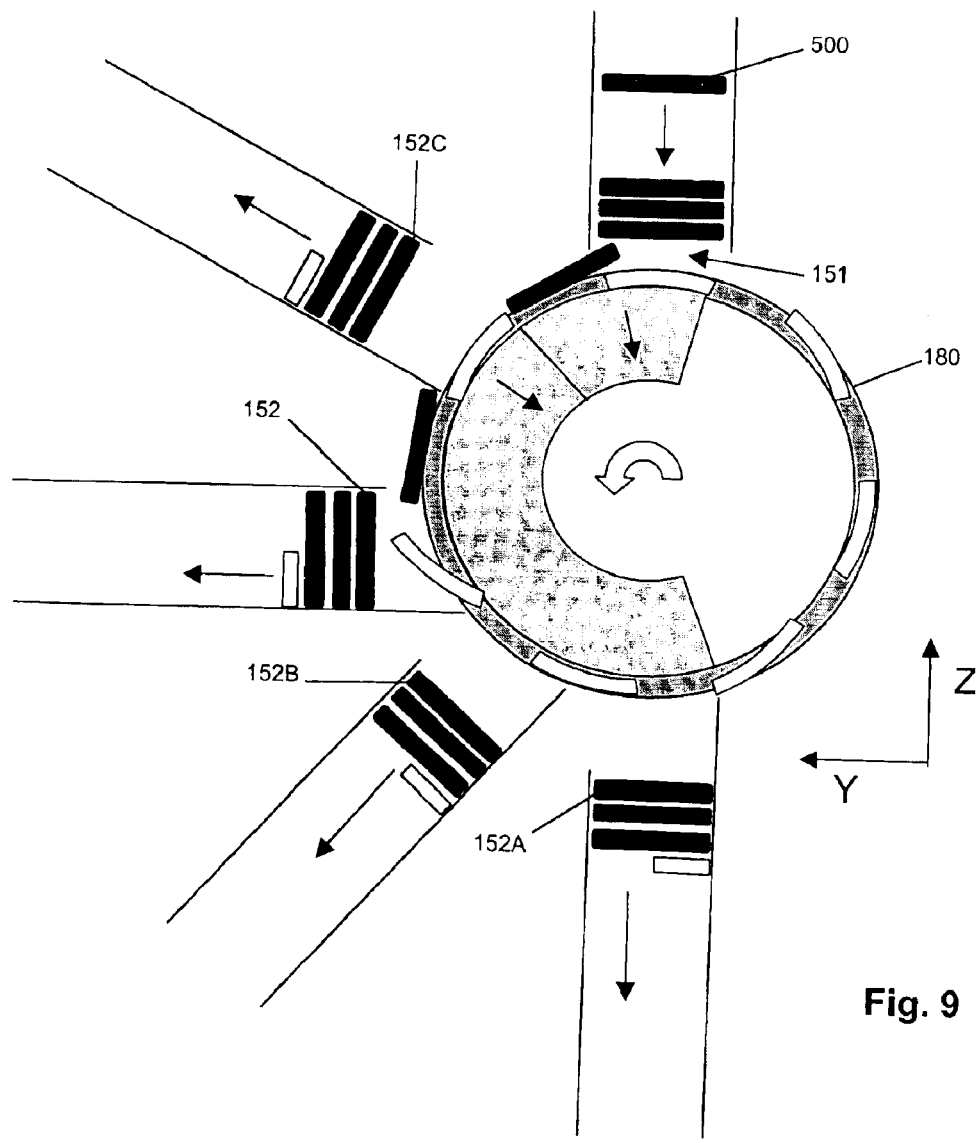
FIG. 9 is a simplified elevation view of the rotary drum including alternative product discharge configurations.

In addition to the stacking position 152 described above, the present invention can include other stacking positions that can be disposed in any suitable orientation, as for example shown in FIG. 9. The pad 500 can be picked up in the pickup position 151 by the rotary drum 180 and transferred to any of the exemplary stacking positions 152, 152A, 152B, or 152C.

EXAMPLE 2

Second Flexible Manufacturing System

Figure 10:
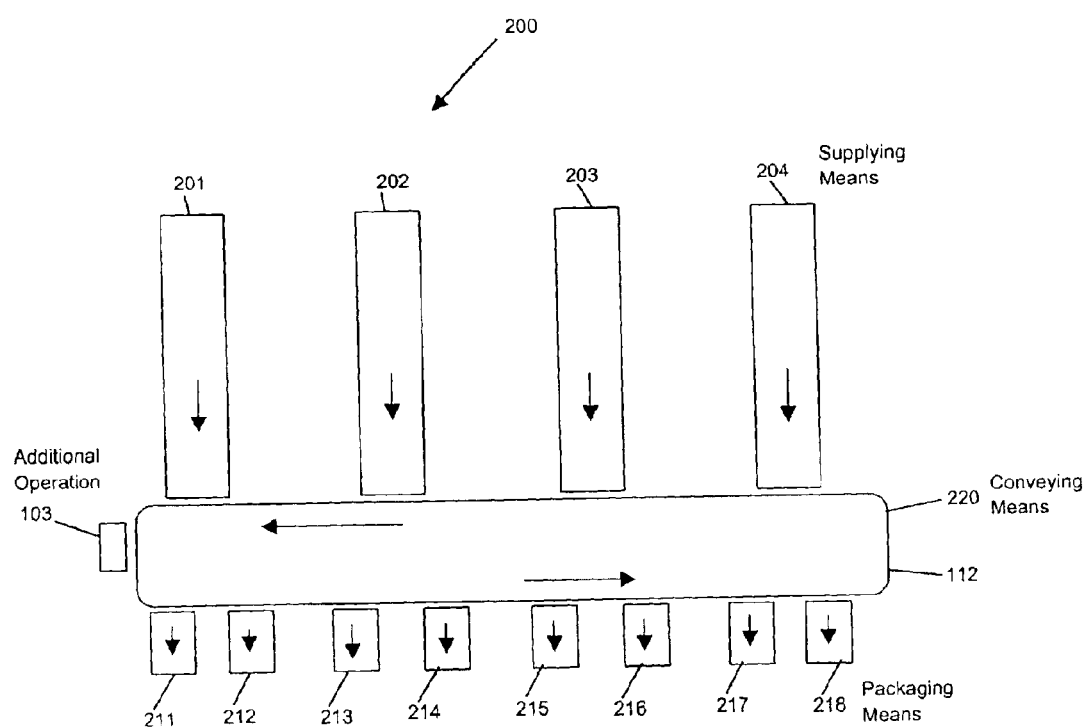
FIG. 10 is a schematic plan view of a second flexible manufacturing system of the present invention capable of providing different products and packaging these different products into different packages.

FIG. 10 is a schematic plan view of a second flexible manufacturing system 200 of the present invention capable of providing different products and packaging these different products into different packages. As noted above, the term "different product(s)" refers to both (1) different types of products (e.g., a feminine hygiene pad, a fastening diaper, a pull-on diaper, and the like) and (2) the same type of products having different sizes (e.g., feminine hygiene pads having different sizes).

The second flexible manufacturing system 200 includes a multiplicity of supplying means capable of providing different products. As noted above, the term "supplying means" refers herein to any apparatus capable of providing the same products suitable for packaging. As also noted above, the term "the same products" refers to products produced on the same production line or different production lines according to the same product specification and include any consumer product defined above. The term "supplying means" can include a production line capable of producing the same products, for example, a production line capable of producing the same feminine hygiene pads, or a production line capable of producing the same baby diaper, and the like.

The present invention can include any suitable number of supplying means. As an example, FIG. 10 shows four supplying means—201, 202, 203, and 204. Each of the supplying means 201, 202, 203, and 204 can supply only the same products, however, the combination of the supplying means 201, 202, 203, and 204 can supply different products. Accordingly, the second flexible manufacturing system 200 can be capable of providing different products simultaneously. The number of the different products can be any suitable number.

The second flexible manufacturing system 200 further includes a multiplicity of packaging means. As noted above, the term "packaging means" refers herein to any apparatus capable of packaging one or more consumer products into the same packages intended for use by a consumer.

The present invention can include any suitable number of packaging means. As an example, FIG. 10 shows eight packaging means 211, 212, 210, 211,212, 213, 214, and 215. Each of the packaging means 211,212, 210, 211, 212, 213, 214, and 215 can produce the same packages, however, the combination of the packaging means 211, 212, 210, 211, 212, 213, 214, and 215 can produce different packages. As noted above, the term "the same package(s)" refers to packages having the same package form (e.g., a bag, a soft pack, a pouch, a box, a wrap, and the like) and containing the same number of products per package (e.g., from a single product to any suitable number of products). As also noted above, the term "different package(s)" refers to packages (1) having different packaging forms (e.g., a bag, a soft pack, a pouch, a box, a wrap, and the like); (2) containing a different number of products per package (e.g., from a single product to any suitable number of products); and/or (3) containing the same or different products.

The second flexible manufacturing system 200 further includes a conveying means 220 for conveying the different products from the supplying means to the packaging means. As noted above, the term "conveying means" refers herein to an apparatus having a multiplicity of receptors capable of accepting products at the supplying means for conveying the products to the packaging means and discharging the products at the packaging means for packaging.

The conveying means 220 can include receptors of any suitable design utilizing any means or combination of means suitable for accepting, holding, and releasing a particular product or a range of different products. The utilizing means can include gripping (one example of which is shown in FIG. 3 and described above), vacuum, magnetic, electromagnetic, electrostatic, and the like.

The multiplicity of receptors can be attached to any suitable continuous moving means at a certain suitable intervals separating the receptors from each other. The continuous moving means can be, for example, a chain (one example of which is shown in FIG. 3 and described above), a cable, a belt, or the like, forming the continuous path 112 (also shown in FIG. 1) between the supplying means and the packaging means.

The second flexible manufacturing system can also include one or more stacking means that can be specifically suitable for stacking pad-like products defined above. The stacking means of the second flexible manufacturing system 200 can include one or more stacking means, one embodiment of which was described above as the stacking means 140 with respect to the first embodiment 101 of the first flexible manufacturing system 100. However, in the second flexible manufacturing system 200, each of the stacking means can be capable of stacking not only the same pad-like products but also different pad-like products within a suitable dimension range.

EXAMPLE 3

Third Flexible Manufacturing System

Figure 11:
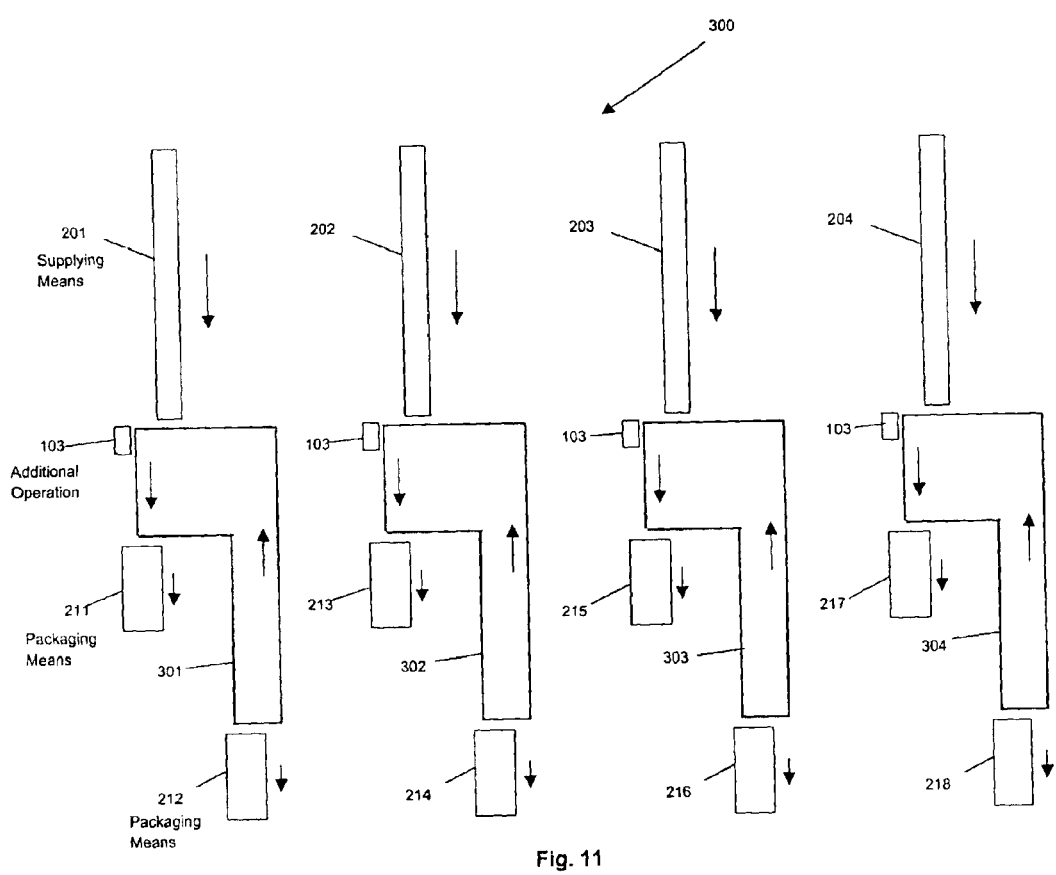
FIG. 11 is a schematic plan view of a third flexible manufacturing system of the present invention capable of providing different products and packaging these different products into different packages.

FIG. 11 is a schematic plan view of a third flexible manufacturing system 300 of the present invention capable of providing different products and packaging these different products into different packages. In contrast to both the first and second flexible manufacturing systems 100 and 200, each having a single conveying means 108 and 220, respectively, the third flexible manufacturing system 300 has a multiplicity of conveying means, for example, four conveying means, 301, 302, 303, and 304, as shown in FIG. 11. It should be noted, that the third flexible manufacturing system 300 can have any suitable number of conveying means.

Each of the conveying means 301, 302, 303, and 304 can include the conveying means 108 of the first flexible manufacturing system 100 for conveying the same products and/or the conveying means 220 of the second flexible manufacturing system 200 for conveying different products. Accordingly, the makeup of each of the conveying means 301, 302, 303, and 304 of the third flexible manufacturing system 300 can be similar in all or any aspects to the makeup of the conveying systems 108 and/or 220 of the first and the second flexible manufacturing systems 100 and 200, respectively, described above.

Each of the conveying means 301, 302, 303, and 304 of the third flexible manufacturing system 300 can be configured with at least one supplying means and at least one packaging means. As an example, FIG. 11 shows that each of the conveying means 301, 302, 303, and 304 is configured with a single supplying means 201, 202, 203, and 204, respectively, and with a pair of packaging means 211 and 212,213 and 214, 215 and 216, and 217 and 218, respectively. However, similarly to the first and second flexible manufacturing systems 100 and 200, respectively, each of the conveying systems 301, 302, 303, and 304 of the third flexible manufacturing system 300 can be configured with any suitable number of supplying means and any suitable number of packaging means.

The third flexible manufacturing system 300 can also include one or more stacking means (not shown) that can be specifically suitable for stacking the pad-like products defined above. The third flexible manufacturing system 300 can include any suitable number of stacking means, one embodiment of which was described above as the stacking means 140, with respect to the first embodiment 101 of the first flexible manufacturing system 100. However, similarly to the second flexible manufacturing system 200, in the third flexible manufacturing system 300, each of the stacking means can be capable of stacking not only the same pad-like products but also different pad-like products within a suitable dimension range.

Additional Capabilities

Figure 12A:
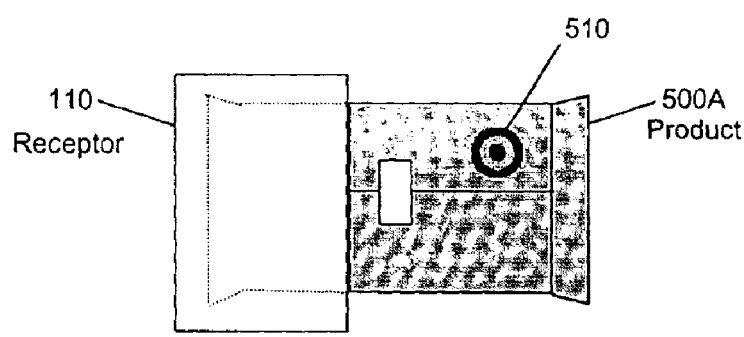
FIGS. 12A, 12B, and 12C are simplified views of receptors carrying products having exemplary images provided by additional operations.
Figure 12B:
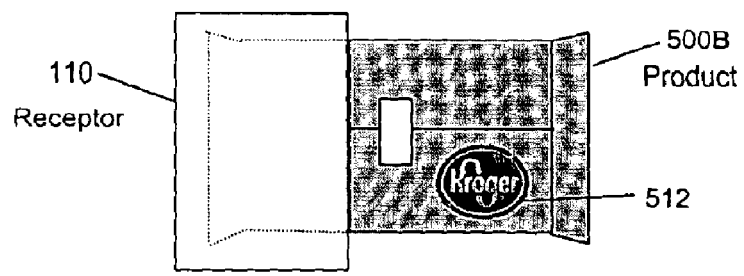
Figure 12C:
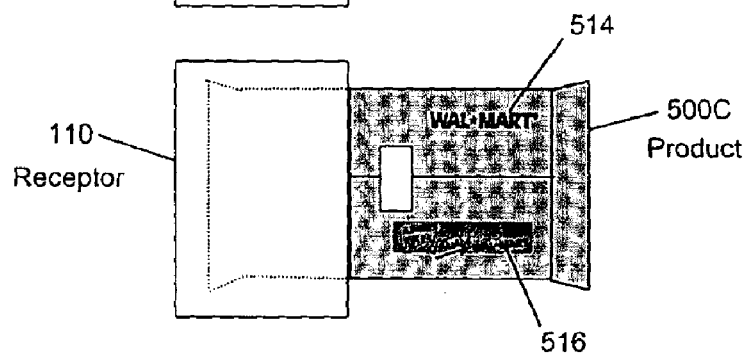

Besides of providing the production and packaging of the same or different consumer products into different packages, the flexible manufacturing system of the present invention can provide additional capabilities characterized by accommodating additional process operations. For example, some products of the flexible manufacturing system of the present invention need to have different labels or printed images than other products produced by this flexible manufacturing system. Some limiting examples of products having different labels or printed images are shown in FIGS. 12A, 12B, and 12C.

The additional process operations can provide different labels and/or printed images to selected products. This capability can be beneficial to meet particular marketing needs, including improved product identification and selection by consumers.

The labels and/or printed images can be provided to selected products while the products being carried by the receptors from the supplying means to the packaging means. The labels and/or printed images can be provided at any suitable place on the carried products, as for example, is shown in FIGS. 12A, 12B, and 12C, showing products 500A, 500B, and 500C, respectively, carried by the receptors 10 and having images 510, 512, 514, and 516, respectively, that can be provided by the additional process operations of the present invention.

The additional process operations can include any suitable commercial labeling device, ink-jet printer, and the like. The additional process operations can be suitably disposed at any suitable location of the conveying means of the present invention. FIG. 1 shows an exemplary location of an exemplary additional operation 103, which can be a label-attaching operation, a printing operation, preferably an ink-jet printing operation, and the like. Similarly, FIGS. 10 and 11 show exemplary locations of an exemplary additional process operation 103, which can also be any operation noted above. Although each of the FIGS. 1, 10, and 11 show a single additional process operation 103, the flexible system of the present invention can include any suitable number of additional process operations capable of providing different labels and/or images to selected products of the flexible manufacturing system of the present invention.

Name List 100, 200, 300—first, second, third flexible manufacturing systems
201, 202, 203, 204—supplying means
211, 212, 213, 214, 215, 216, 217, 218—packaging means
103 additional process operation
108, 220, 301, 302, 303, 304—conveying means
101 first embodiment of the first system 100
109 one embodiment of the conveying means 108
110 receptor
112 continuous path;
113 chain
116 jaw; pivoting jaw
118 jaw; stationary jaw
124 product pickup station
126, 128 product release station
130 cam follower
131 cam profile
132 opening cam
134 bypass cam
136 diverter
138 cam entrance
140, 142 stacking means
150 releasing position
151 pickup position
152, 152A, 152B, 152C stacking position
153 stack
154 moving guide
155 first direction
156 belt
157 stationary guide
160 first descending means
161 belt
162 prong
163 outer surface of the belt 161
170 second descending means
171 paddle
172 chain
174 platform
175 horizontal position
176 vertical position
177 chute guide
180 rotary drum
181 supporting surface
182 second direction
183 bar
184 bar conveyor
186 overhead conveyor
188 overhead plate
189 outer surface of rotary drum
190 drum shell
192 vacuum manifold
193 vacuum hole
500, 500A, 500B, 500C—feminine hygiene pads
502 folded pad width
504 folded pad length
506 folded pad caliper
510, 512, 514, 516 labels or printed images
L, H—low and high level detection means All documents cited in the Detailed Description of the Invention are, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A flexible manufacturing system for producing and packaging consumer products into different packages, comprising:

(a) one or more supplying means for providing said consumer products;

(b) a multiplicity of packaging means for packaging said consumer products into different packages;

(c) one or more conveying means for conveying said consumer products from said supplying means to said packaging means, said conveying means forming a continuous path linking said one or more supplying means with said multiplicity of packaging means, said continuous path comprising a multiplicity of receptors, wherein each of said receptors is capable of accepting, carrying, and discharging a consumer product; and (d) one or more stacking means for arranging said consumer products into separate stacks for packaging, said one or more stacking means being disposed vertically between said one or more supplying means and said multiplicity of packaging means, wherein said one or more stacking means comprises: (a) a first descending means disposed at the outmost vertical position of said stacking means, for receiving said pad-like products at a releasing station disposed at said continuous path of said releasing means, and for maintaining a horizontal orientation of said pad-like products; (b) a second descending means disposed adjacent below said first descending means, for maintaining said horizontal orientation of said pad-like products descending from said first descending means and for delivering said pad-like products into a pickup position; (c) a rotary drum disposed adjacent below said second descending means, for transferring the pad-like products from said pickup position to a stacking position; (d) a bar conveyor disposed adjacent said stacking position, for accumulating a stack of said pad-like products; and (e) an overhead conveyor disposed adjacent and perpendicularly to said bar conveyor for accumulating one or more said stack of said pad-like products and for supplying said one or more stack of said pad-like products to said packaging means for packaging into said package.

2. The flexible manufacturing system of claim 1 wherein said one or more supplying means comprises a production line capable of producing said consumer products.

3. The flexible manufacturing system of claim 1 wherein said multiplicity of packaging means comprises a packaging apparatus capable of packaging said consumer products.

4. The flexible manufacturing system of claim 3 wherein said packaging apparatus is a bag packaging apparatus, a soft pack packaging apparatus, a pouch packaging apparatus, a box packaging apparatus, or a wrap packaging apparatus.

5. The flexible manufacturing system of claim 1 wherein said receptors utilize means selected from the group consisting of gripping means, vacuum means, magnetic means, electromagnetic means, electrostatic means, and any combination thereof.

6. The flexible manufacturing system of claim 1 wherein said receptors comprise a multiplicity of gripping receptors.

7. The flexible manufacturing of claim 1 wherein said continuous path further comprises a chain.

8. The flexible manufacturing system of claim 1 wherein said one or more conveying means further comprises one or more pickup station for picking up said consumer products at said supplying means and a multiplicity of release station for releasing said consumer products.

9. The flexible manufacturing system of claim 1 wherein said consumer products are feminine sanitary napkins, feminine tampons, feminine incontinence articles, baby fastening diapers, baby pull-on diapers, baby swim pants, adult incontinence pads; baby bibs, baby wipes, adult wipes, or household cleaning wipes.

10. The flexible manufacturing system of claim 1 wherein said consumer products are the same products or different products.

11. The flexible manufacturing system of claim 1 wherein the continuous path is a moving path or a stationary path.

12. The flexible manufacturing system of claim 1 further comprising one or more additional process operations, the additional process operations being selected from the group consisting of a label-attaching device and a printing device.

13. The flexible manufacturing system of claim 12 wherein said printing device comprises an ink-jet printer.

14. A flexible manufacturing system for producing and packaging pad-like products into different packages, comprising:

(a) one or more supplying means for providing said pad-like products, said pad-like products being suitable for packaging;

(b) a multiplicity of packaging means for packaging said pad-like products into different packages;

(c) one or more conveying means for conveying said pad-like products from said supplying means to said packaging means, said conveying means forming a continuous path linking said one or more supplying means with said multiplicity of packaging means, said continuous path comprising a multiplicity of receptors, wherein each of said receptors is capable of accepting, carrying, and discharging a pad-like product; and (d) a multiplicity of stacking means for arranging said pad-like products into separate stacks for packaging, said multiplicity of stacking means being disposed vertically between said one or more supplying means and said multiplicity of packaging means, at least one of said multiplicity of stacking means comprising:

a. a first descending means disposed at the outmost vertical position of said stacking means, for receiving said pad-like products at a releasing station disposed at said continuous path of said releasing means, and for maintaining a horizontal orientation of said pad-like products;

b. a second descending means disposed adjacent below said first descending means, for maintaining said horizontal orientation of said pad-like products descending from said first descending means and for delivering said pad-like products into a pickup position;

c. a rotary drum disposed adjacent below said second descending means, for transferring the pad-like products from said pickup position to a stacking position;

d. a bar conveyor disposed adjacent said stacking position, for accumulating a stack of said pad-like products; and e. an overhead conveyor disposed adjacent and perpendicularly to said bar conveyor for accumulating one or more said stack of said pad-like products and for supplying said one or more stack of said pad-like products to said packaging means for packaging into said package.

* * * * *